(12) United States Patent
Akiyama et al.

(10) Patent No.: US 11,851,850 B2
(45) Date of Patent: Dec. 26, 2023

(54) DATA COLLECTION DEVICE OF WORK MACHINE, DATA PROVIDING SYSTEM FOR WORK MACHINE, AND DATA COLLECTION METHOD OF WORK MACHINE

(71) Applicant: KOMATSU LTD., Tokyo (JP)

(72) Inventors: Naoki Akiyama, Tokyo (JP); Hirotaka Yuno, Tokyo (JP); Jun Yamane, Tokyo (JP)

(73) Assignee: KOMATSU LTD., Tokyo (JP)

( * ) Notice: Subject to any disclaimer, the term of this patent is extended or adjusted under 35 U.S.C. 154(b) by 361 days.

(21) Appl. No.: 17/269,779

(22) PCT Filed: Aug. 16, 2019

(86) PCT No.: PCT/JP2019/032138
§ 371 (c)(1),
(2) Date: Feb. 19, 2021

(87) PCT Pub. No.: WO2020/066357
PCT Pub. Date: Apr. 2, 2020

(65) Prior Publication Data
US 2021/0317639 A1 Oct. 14, 2021

(30) Foreign Application Priority Data
Sep. 28, 2018 (JP) ................................. 2018-185964

(51) Int. Cl.
*E02F 9/26* (2006.01)
(52) U.S. Cl.
CPC ...................................... *E02F 9/26* (2013.01)

(58) Field of Classification Search
CPC ........... E02F 9/2054; E02F 9/26; E02F 9/267; G06F 17/40
See application file for complete search history.

(56) References Cited

U.S. PATENT DOCUMENTS

| 8,160,766 B2 * | 4/2012 | Donnelli ............. B60C 23/0479 |
| | | 702/98 |
| 9,606,529 B2 * | 3/2017 | Livesay ........... G05B 19/41835 |
| (Continued) | | |

FOREIGN PATENT DOCUMENTS

| JP | 2011-176795 A | 9/2011 |
| JP | 2016-4324 A | 1/2016 |
| WO | 2013/042246 A1 | 3/2013 |

OTHER PUBLICATIONS

The International Search Report for the corresponding international application No. PCT/JP2019/032138, dated Oct. 29, 2019.

*Primary Examiner* — Tyler J Lee
(74) *Attorney, Agent, or Firm* — Global IP Counselors, LLP

(57) ABSTRACT

A data collection device is mounted on a work machine and collects data that is collectable from the work machine. The data collection device includes a collectable list generation unit and a collectable list notification unit. The collectable list generation unit updates a collectable list indicating a type of data that is collectable from the work machine, in a case in which a change has occurred in the type of data that is collectable. The collectable list notification unit transmits the updated collectable list to an external device outside the work machine.

10 Claims, 16 Drawing Sheets

(56) References Cited

U.S. PATENT DOCUMENTS

| | | | |
|---|---|---|---|
| 2003/0074134 A1* | 4/2003 | Shike | G08G 1/20 |
| | | | 342/357.57 |
| 2006/0015755 A1 | 1/2006 | Jaffe | |
| 2006/0287783 A1* | 12/2006 | Walker | H04Q 9/00 |
| | | | 701/31.4 |
| 2010/0131147 A1* | 5/2010 | Donnelli | G07C 5/008 |
| | | | 701/31.4 |
| 2010/0302974 A1* | 12/2010 | Niiyama | G07C 5/0808 |
| | | | 370/254 |
| 2011/0191392 A1 | 8/2011 | Kameda et al. | |
| 2014/0225743 A1 | 8/2014 | Kuroiwa | |
| 2016/0034158 A1* | 2/2016 | Livesay | G05B 19/41835 |
| | | | 715/736 |
| 2016/0300195 A1* | 10/2016 | Harvey | G06Q 10/20 |
| 2018/0164994 A1* | 6/2018 | Junck | G06F 3/04847 |
| 2018/0248965 A1* | 8/2018 | Gibson | H04L 67/535 |

* cited by examiner

| IDENTIFIER | VALUE | TIME STAMP |
|---|---|---|
| X1 | ******** | XXXX/XX/XX 00:00:01 |

FIG. 4
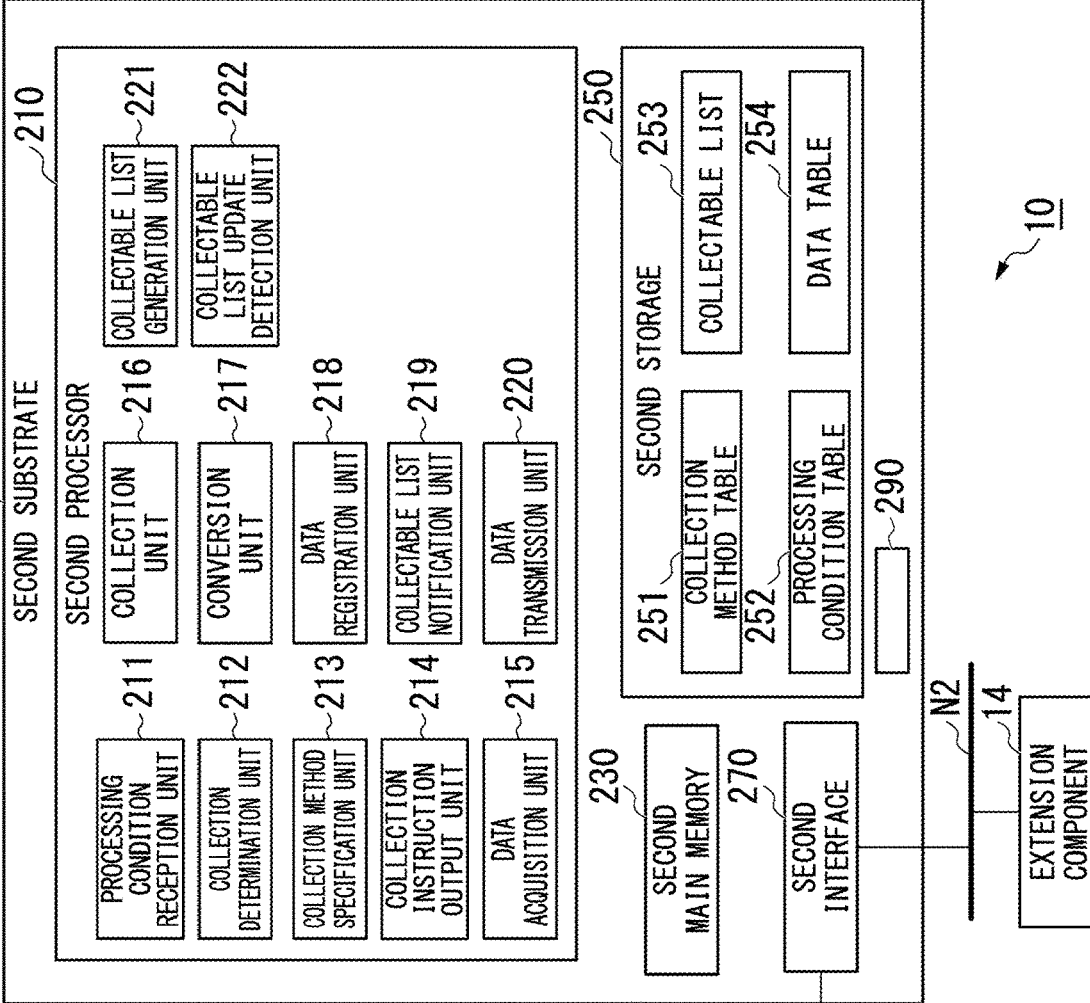
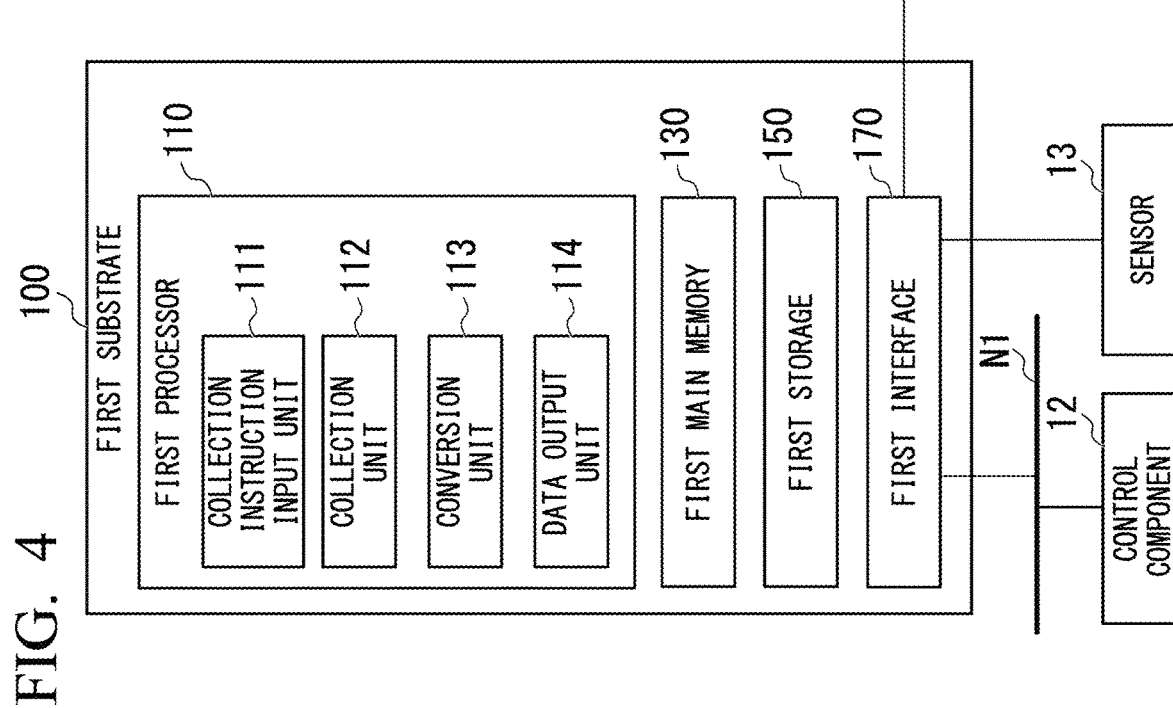

FIG. 6

| COMPONENT | IDENTIFIER | COLLECTION METHOD | | | |
|---|---|---|---|---|---|
| | | TYPE OF UNIT DATA | OFFSET | DATA LENGTH | ⋯ |
| C1 | X1 | Y1 | 0 | 8 | ⋯ |
| | X2 | Y2 | 8 | 4 | ⋯ |
| | ⋮ | ⋮ | ⋮ | ⋮ | ⋮ |
| C2 | X11 | Y1 | 0 | 16 | ⋯ |
| | ⋮ | ⋮ | ⋮ | ⋮ | ⋮ |
| ⋮ | ⋮ | ⋮ | ⋮ | ⋮ | ⋮ |

| IDENTIFIER | DISTRIBUTION METHOD | COLLECTION CYCLE | TRANSMISSION CYCLE |
|---|---|---|---|
| X1 | PUSH | – | 1min |
| X3 | PULL | 1sec | 1min |
| X4 | PUSH | – | 5min |
| X9 | PULL | 2sec | 1min |
| ⋮ | ⋮ | ⋮ | ⋮ |

| IDENTIFIER |
|---|
| X1 |
| X2 |
| X3 |
| X4 |
| ⋮ |

FIG. 9
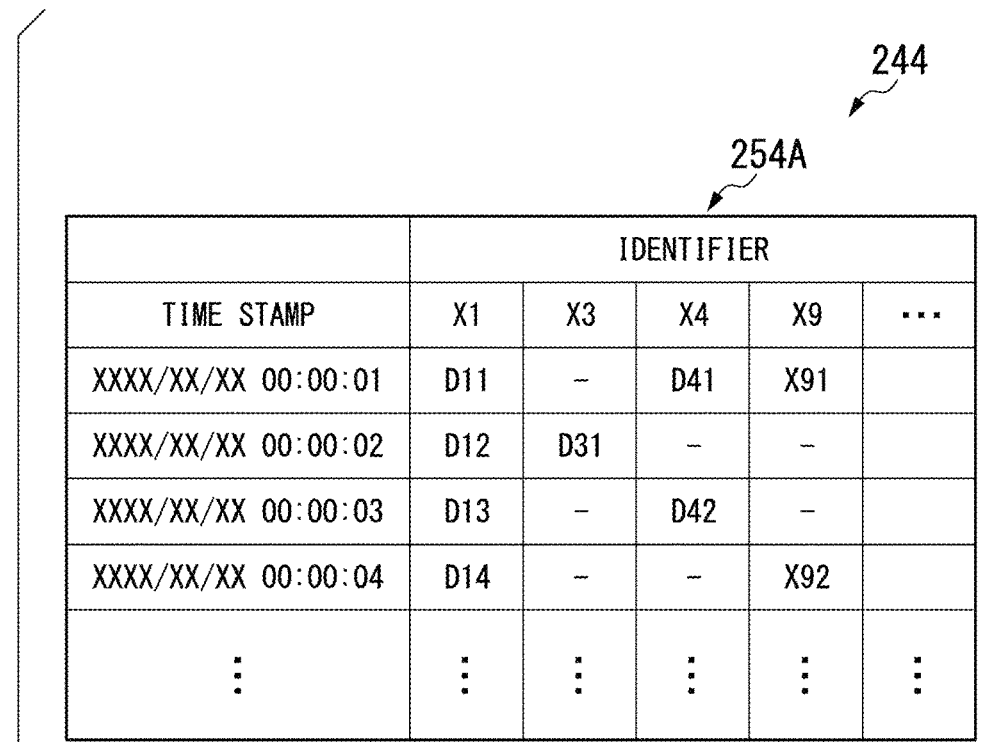
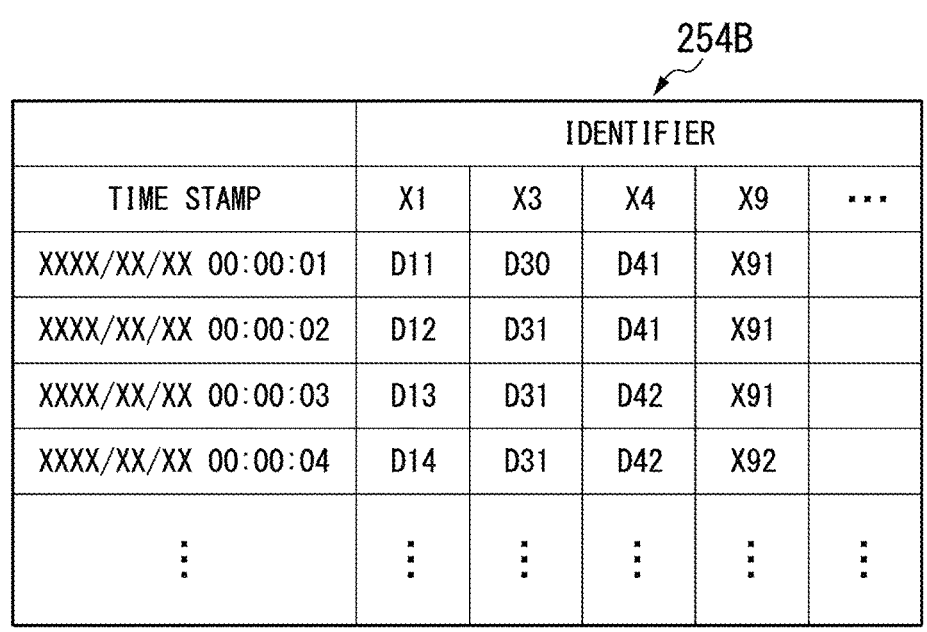

FIG. 11

| IDENTIFIER | DISPLAY NAME | DESCRIPTION | TAG | DATA TYPE | SIZE | UNIT | GAIN | OFFSET | Admin AUTHORITY | User AUTHORITY | ... |
|---|---|---|---|---|---|---|---|---|---|---|---|
| X1 | XXX TEMPERATURE | TEMPERATURE OF XXX | XXX, XXX, XXX... | uint16 | 2 | °C | 1 | 0 | r | r | |
| X2 | XXX ROTATION SPEED | ROTATION SPEED OF XXX | XXX, XXX, XXX... | uint16 | 2 | rpm | 1 | 0 | r | r | |
| X3 | XXX TROUBLE | PRESENCE OR ABSENCE OF TROUBLE ON XXX | XXX, XXX, XXX... | Bool | 1 | - | 1 | 0 | r | r | |
| X4 | XXX STATE | STATE OF XXX | XXX, XXX, XXX... | Uint8 | 1 | - | 1 | 0 | r | r | |
| ... | ... | ... | ... | ... | ... | ... | ... | ... | ... | ... | |

| COMPONENT | IDENTIFIER | COLLECTION METHOD |
|---|---|---|
| C1 | X1 | ..... |
|  | X2 | ..... |
|  | ⋮ | ⋮ |
| C2 | X11 | ..... |
|  | ⋮ | ⋮ |
| ⋮ | ⋮ | ⋮ |

⬆ ADDITION

251n

| COMPONENT | IDENTIFIER | COLLECTION METHOD |
|---|---|---|
| Cn | Xa1 | ..... |
|  | Xa2 | ..... |
|  | ⋮ | ⋮ |

FIG. 17
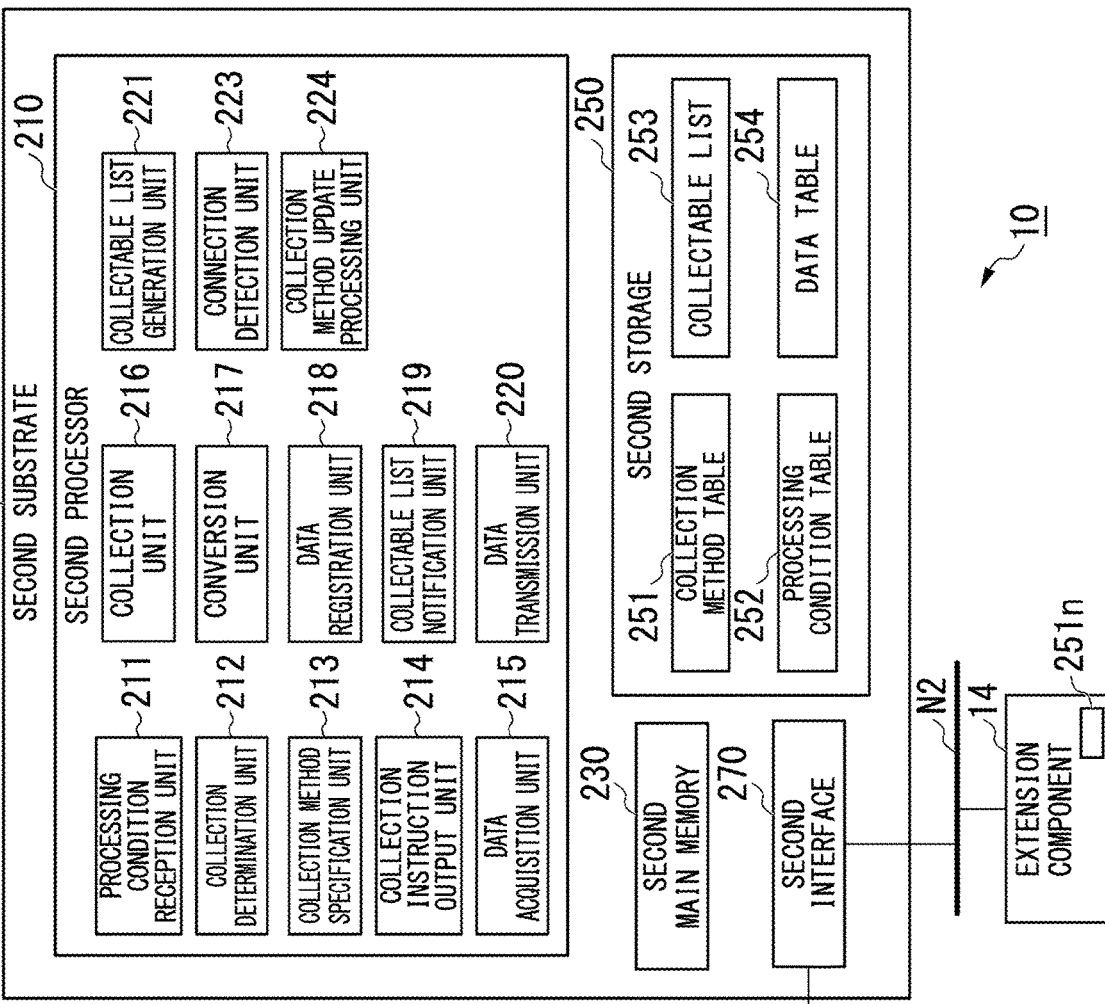
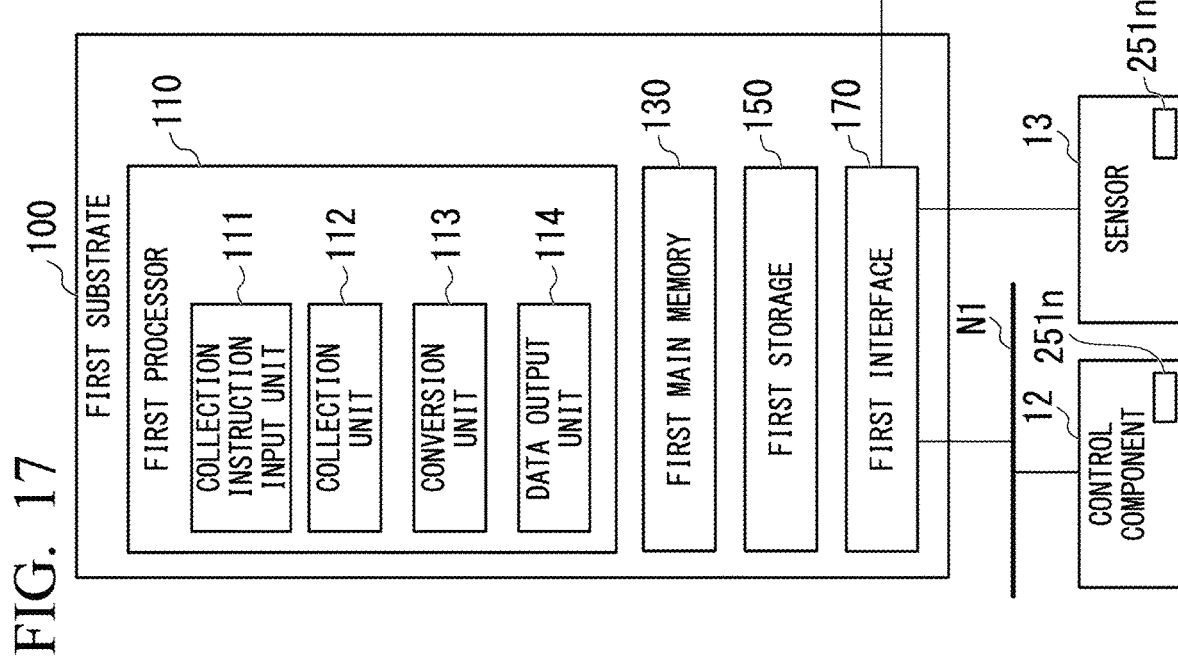

DATA COLLECTION DEVICE OF WORK MACHINE, DATA PROVIDING SYSTEM FOR WORK MACHINE, AND DATA COLLECTION METHOD OF WORK MACHINE

CROSS-REFERENCE TO RELATED APPLICATIONS

This application is a U.S. National stage application of International Application No. PCT/JP2019/032138, filed on Aug. 16, 2019. This U.S. National stage application claims priority under 35 U.S.C. § 119(a) to Japanese Patent Application No. 2018-185964, filed in Japan on Sep. 28, 2018, the entire contents of which are hereby incorporated herein by reference.

BACKGROUND

Field of the Invention

The present invention relates to a data collection device of a work machine, a data providing system for a work machine, and a data collection method of a work machine.

Background Information

A technique is known in which data indicating the state of a work machine is collected from the work machine that performs work at a construction site or the like and the operating state of each work machine is monitored and analyzed.

There is a case where data indicating the state of the work machine is collected through each component mounted on the work machine. The type of data to be collected from each component is recorded in a program for each component. When a user intends to modify the data to be collected from the work machine, it is necessary to newly develop the program for each component itself, which takes a lot of time.

Additionally, since the components mounted on each of a plurality of work machines are different for each work machine, there is a case where the types of data that is collectable from the individual work machines are different for each work machine.

Japanese Unexamined Patent Application, First Publication No. 2011-176795 discloses a gateway device that can change management modes of data in a vehicle depending on a change in data required by a device outside the vehicle, in a data management device that manages data in the vehicle. The gateway device receives a management rule from the device outside the vehicle, acquires data based on this management rule, and transmits the data to the device outside the vehicle.

SUMMARY

In a case where a user intends to collect data from a certain work machine, there is a need to select the data to be collected from a list of data that is collectable from the work machine. However, there is a case where a new component is added or a component is removed after the work machine is shipped. For that reason, the user needs to select the data to be collected from the list of data that is collectable in the latest state of the component of the work machine.

An object of the present invention is to provide a data collection device of a work machine capable of selecting data to be collected from a list of data that is collectable in a latest state of the component of the work machine, a data providing system for a work machine, and a data collection method of a work machine.

According to an aspect of the present invention, a data collection device of a work machine is provided, the data collection device being mounted on a work machine and collecting data that is collectable from the work machine. The data collection device comprises a collectable list generation unit that generates a collectable list indicating a type of data that is collectable from the work machine; and a collectable list notification unit that transmits a list of the type of data indicated in the collectable list to an external device.

According to the above aspect, the type of data registered in the collectable list of the external device can be matched with the type of data that is actually collectable from each work machine.

BRIEF DESCRIPTION OF DRAWINGS

FIG. 4 is a block diagram illustrating a configuration of the work machine according to the first embodiment.
FIG. 6 is a view illustrating a data structure of a collection rule table.
FIG. 7 is a view illustrating a data structure of a processing condition table.
FIG. 8 is a view illustrating a data structure of a collectable list.
FIG. 9 is a view illustrating a data structure of a data table.
FIG. 11 is a view illustrating a data structure of a definition database.
FIG. 15 is a view for explaining the processing of the data collection device according to the first embodiment in detail.
FIG. 17 is a block diagram illustrating a configuration of a work machine according to a second embodiment.

DETAILED DESCRIPTION OF EMBODIMENT(S)

First Embodiment

Hereinafter, a data collection device according to a first embodiment and a data providing system including the data collection device will be described in detail with reference to FIGS. 1 to 16.

(Overall Configuration)

Figures 1, 2:
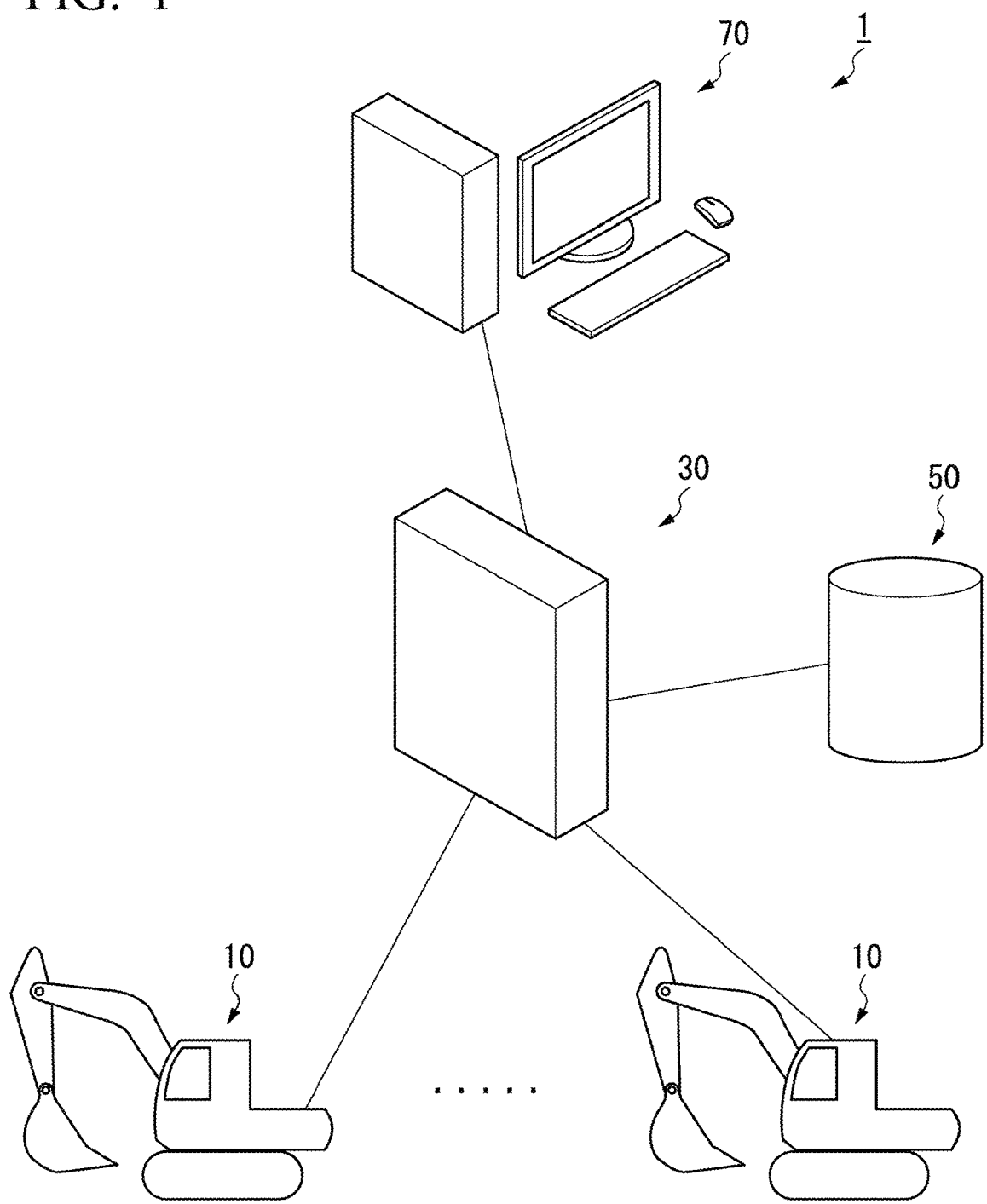
FIG. 1 is a view illustrating an overall configuration of a data providing system according to a first embodiment.
FIG. 2 is a view illustrating the format of a unified format.

FIG. 1 is a view illustrating an overall configuration of the data providing system according to the first embodiment.

The data providing system 1 provides data related to the plurality of work machines 10 for use by a user. The data providing system 1 includes a plurality of work machines 10, a data server 30, a definition database 50, and a user device 70. Each work machine 10 collects data related to the work machine 10 and transmits the data to the data server 30. The data server 30 stores the data collected from the plurality of work machines 10 and provides the data to the user device 70. The definition database 50 stores information necessary for providing data by the data server 30. The user device 70 sets the conditions of the data to be collected by each work machine 10 and also acquires the data related to the work machine 10 from the data server 30.

In a case where communication of the data related to the work machine 10 between the work machine 10 and the data server 30 and between the data server 30 and the user device 70, the communication using unit data in the unified format is performed. The unified format is a unit data format that stores the value of one type of data. The work machine 10 stores a plurality of values included in the unit data of a CAN collected from respective components in the unit data in the unified format, respectively, and transmits the values to the data server 30. The data server 30 and the user device 70 are examples of external devices outside a vehicle. The unit data is also called a data frame, a packet, or a protocol data unit (PDU).

Hereinafter, the unit data in the format of the unified format is referred to as a unified data object.

FIG. 2 is a view illustrating the format of the unified format.

The unified format stores an identifier indicating the type of data, a value of the data, and a time stamp indicating the time when each component have acquired the data. Only one identifier, one value, and one time stamp are stored in one unified data object.

(Configuration of Work Machine 10)

Figure 3:
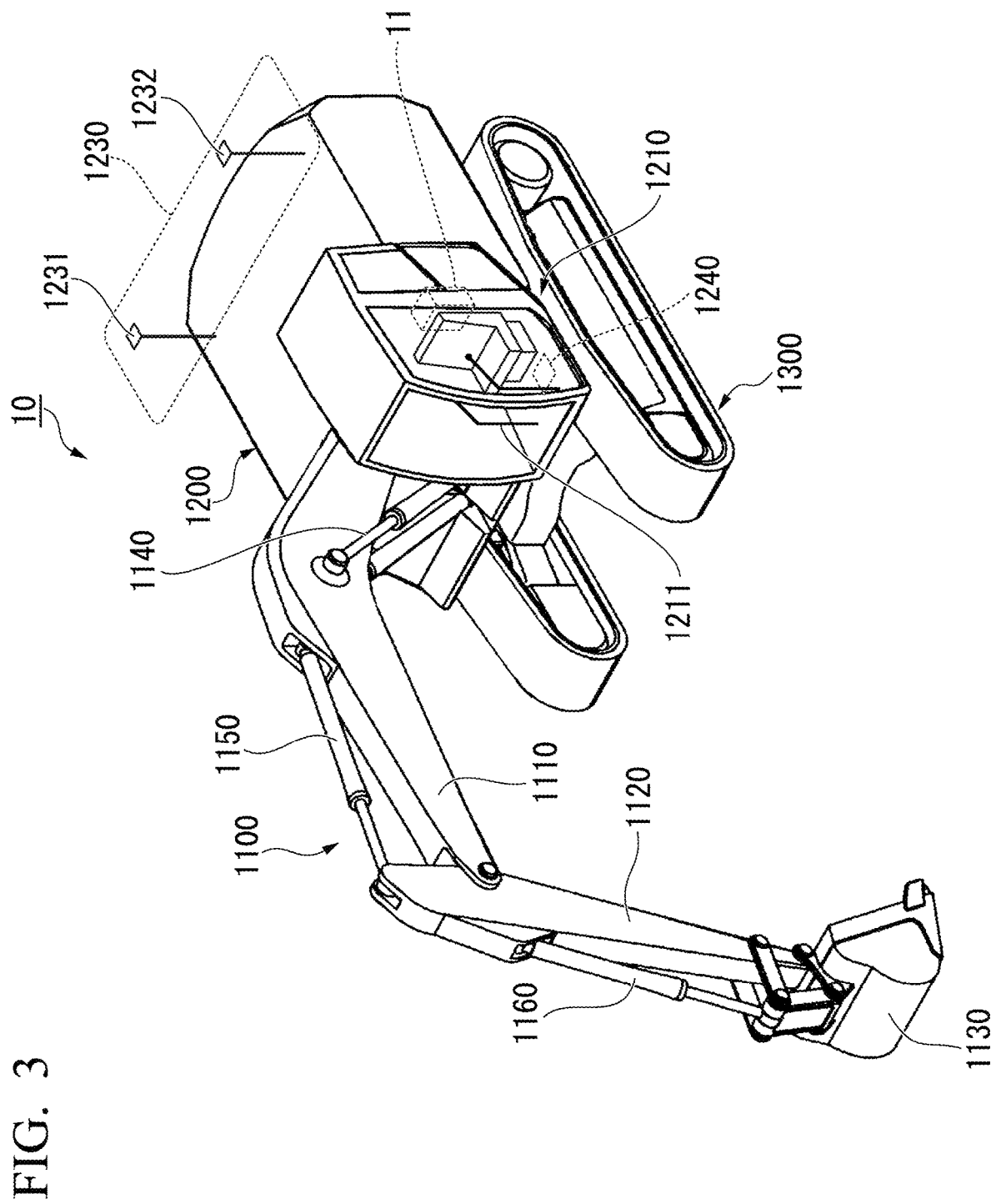
FIG. 3 is a perspective view illustrating the appearance of a work machine.

FIG. 3 is a perspective view illustrating the appearance of the work machine 10.

The work machine 10, which is an example of a work machine, includes a piece of work equipment 1100 that is hydraulically activated, a swing body 1200 that supports the work equipment 1100, and a carriage 1300 which supports the swing body 1200.

(Work Equipment 1100)

The work equipment 1100 includes a boom 1110, an arm 1120, a bucket 1130, a boom cylinder 1140, an arm cylinder 1150, and a bucket cylinder 1160.

The boom 1110 is a strut that supports the arm 1120 and the bucket 1130. A proximal end part of the boom 1110 is attached to a front part of the swing body 1200 via a pin.

The arm 1120 couples the boom 1110 to the bucket 1130. The proximal end part of the arm 1120 is attached to a distal end part of the boom 1110 via a pin.

The bucket 1130 is a container having a blade for excavating earth, sand or the like. A proximal end part of the bucket 1130 is attached to a distal end part of the arm 1120 via a pin.

The boom cylinder 1140 is a hydraulic cylinder for activating the boom 1110. A proximal end part of the boom cylinder 1140 is attached to the swing body 1200. A distal end part of the boom cylinder 1140 is attached to the boom 1110.

The arm cylinder 1150 is a hydraulic cylinder for driving the arm 1120. The proximal end part of the arm cylinder 1150 is attached to the boom 1110. A distal end part of the arm cylinder 1150 is attached to the arm 1120.

The bucket cylinder 1160 is a hydraulic cylinder for driving the bucket 1130. A proximal end part of the bucket cylinder 1160 is attached to the arm 1120. A distal end part of the bucket cylinder 1160 is attached to the bucket 1130.

(Swing Body 1200)

The swing body 1200 is provided with a cab 1210 on which an operator gets. The cab 1210 is provided in front of the swing body 1200 and on the left side of the work equipment 1100.

An operating device 1211 for operating the work equipment 1100 is provided inside the cab 1210. Hydraulic oil is supplied to the boom cylinder 1140, the arm cylinder 1150, and the bucket cylinder 1160 depending on the amount of operation of the operating device 1211, and the work equipment 1100 is driven.

(Component)

The work machine 10 includes a position and azimuth direction calculator 1230 and a tilt detector 1240. The position and azimuth direction calculator 1230 and the tilt detector 1240 are examples of the components. Additionally, the work machine 10 includes a data collection device 11 that collects data related to the work machine 10 and transmits the data to the data server 30. The data collection device 11 is provided in the cab 1210. A control component 12 and an extension component 14 to be described below may be similarly provided in the cab 1210, and may be provided outside the cab 1210, for example, on the swing body 1200.

The position and azimuth direction calculator 1230 calculates the position of the swing body 1200 and the azimuth direction in which the swing body 1200 faces. The position and azimuth direction calculator 1230 includes a first receiver 1231 and a second receiver 1232 that receive positioning signals from an artificial satellite that constitute a global navigation satellite system (GNSS). The first receiver 1231 and the second receiver 1232 are installed at different positions on the swing body 1200, respectively. The position and azimuth direction calculator 1230 detects the position of a representative point O (the origin of a vehicle body coordinate system) of the swing body 1200 in a field coordinate system based on a positioning signal received by the first receiver 1231.

The position and azimuth direction calculator 1230 calculates the azimuth direction of the swing body 1200 as a relationship of the installation position of the second receiver 1232 with respect to the detected installation position of the first receiver 1231, using the positioning signal received by the first receiver 1231 and the positioning signal received by the second receiver 1232.

The tilt detector 1240 measures the acceleration and angular velocity of the swing body 1200, and, based on the measurement results, detects the tilt of the swing body 1200 (for example, the rolling representing rotation with respect to an Xm axis, the pitching representing the rotation with respect to a Ym axis, and yawing representing the rotation with respect to a Zm axis). The tilt detector 1240 is installed, for example, on a lower surface of the cab 1210. As the tilt detector 1240, for example, an inertial measurement unit (IMU), which is an inertial measurement device, can be used.

FIG. 4 is a block diagram illustrating a configuration of the work machine 10 according to the first embodiment.

The data collection device 11 includes a first substrate 100 and a second substrate 200 that are physically divided. The first substrate 100 constitutes a computer that runs a realtime operating system (OS). The second substrate 200 constitutes a computer that runs a general-purpose OS.

The first substrate 100 includes a first processor 110, a first main memory 130, a first storage 150, and a first interface 170. The first processor 110 reads a program from the first storage 150, develops the program into the first main memory 130, and executes predetermined processing in accordance with the program. The first interface 170 is connected to a plurality of the control components 12 for controlling the work machine 10 via a first network N1. Examples of the control components 12 include an engine control component that acquires various data related to an engine and the like with a sensor and controls the engine and the like, a hydraulic pressure control component that acquires various data related to a piece of hydraulic equipment and the like for controlling the operation of the work equipment 1100 by using a sensor and controls the hydraulic equipment, a monitor control component that acquires data from various sensors of the work machine 10 and performs the display control of a monitor (not illustrated), a communication component that controls communication equipment for communicating with an external server and the like and acquires data from various sensors of the work machine, and the like. The first network N1 is, for example, a CAN. Additionally, the first interface 170 is connected to a sensor 13 that detects the state quantity of the work machine 10. The control components 12 and the sensor 13 are examples of the components mounted on the work machine 10.

The second substrate 200 includes a second processor 210, a second main memory 230, a second storage 250, and a second interface 270. The second processor 210 reads a program from the second storage 250, develops the program into a second main memory 230, and executes predetermined processing in accordance with the program. The second interface 270 is connected to a plurality of the extension components 14 for extending the functions of the work machine 10 via the second network N2. Examples of the extension components 14 include an image display component that performs predetermined image processing on an image captured by a camera and controls the display thereof, a machine guidance component that displays and controls a guidance monitor for guiding a positional relationship between the design aspect of a construction site and the work machine 10, or the like to the operator, a payload component for measuring the amount of soil excavated by the work equipment 1100, and the like. The second network N2 is, for example, a CAN or Ethernet (registered trademark). The extension components 14 are examples of the components mounted on the work machine 10.

In addition, the components that can be mounted on the work machine 10 are not limited to the control components 12, the sensor 13, and the extension components 14. For example, each component may be a display controller that controls a display function of the work machine 10, may be a communication controller that controls the communication function of the work machine 10, or the like.

The first interface 170 and the second interface 270 are communicably connected to each other.

The program stored in the first storage 150 or the second storage 250 may be for realizing some of the functions exhibited by the first substrate 100 or the second substrate 200. For example, the program may exhibit the functions in combination with another program already stored in the first storage 150 or the second storage 250 or in combination with another program mounted on another device. In addition, in another embodiment, the first substrate 100 or the second substrate 200 may include a custom large scale integrated circuit (LSI) such as a programmable logic device (PLD) in addition to or instead of the above configuration. Examples of PLDs include a programmable array logic (PAL), a generic array logic (GAL), a complex programmable logic device (CPLD), and a field programmable gate array (FPGA). In this case, some or all of the functions realized by the first substrate 100 or the second substrate 200 may be realized by the integrated circuit.

Examples of the first storage 150 and the second storage 250 include a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The first storage 150 and the second storage 250 may be internal media directly connected to a bus line or external media connected to the data collection device 11 via the first interface 170 or a communication line. Additionally, this program may be distributed to the data collection device 11 via the communication line, and the first processor 110 or the second processor 210 may execute the program. In at least one embodiment, the first storage 150 and the second storage 250 are non-transitory tangible storage media.

The first processor 110 functions as a collection instruction input unit 111, a collection unit 112, a conversion unit 113, and a data output unit 114 by executing a program stored in the first storage 150.

The collection instruction input unit 111 receives input of a collection instruction including a data collection method from the second substrate 200. The collection method is information for allowing each control component 12 or the sensor 13 to specify the format of the unit data and a region where the value of a collection target is stored in a data part.

Figure 5:
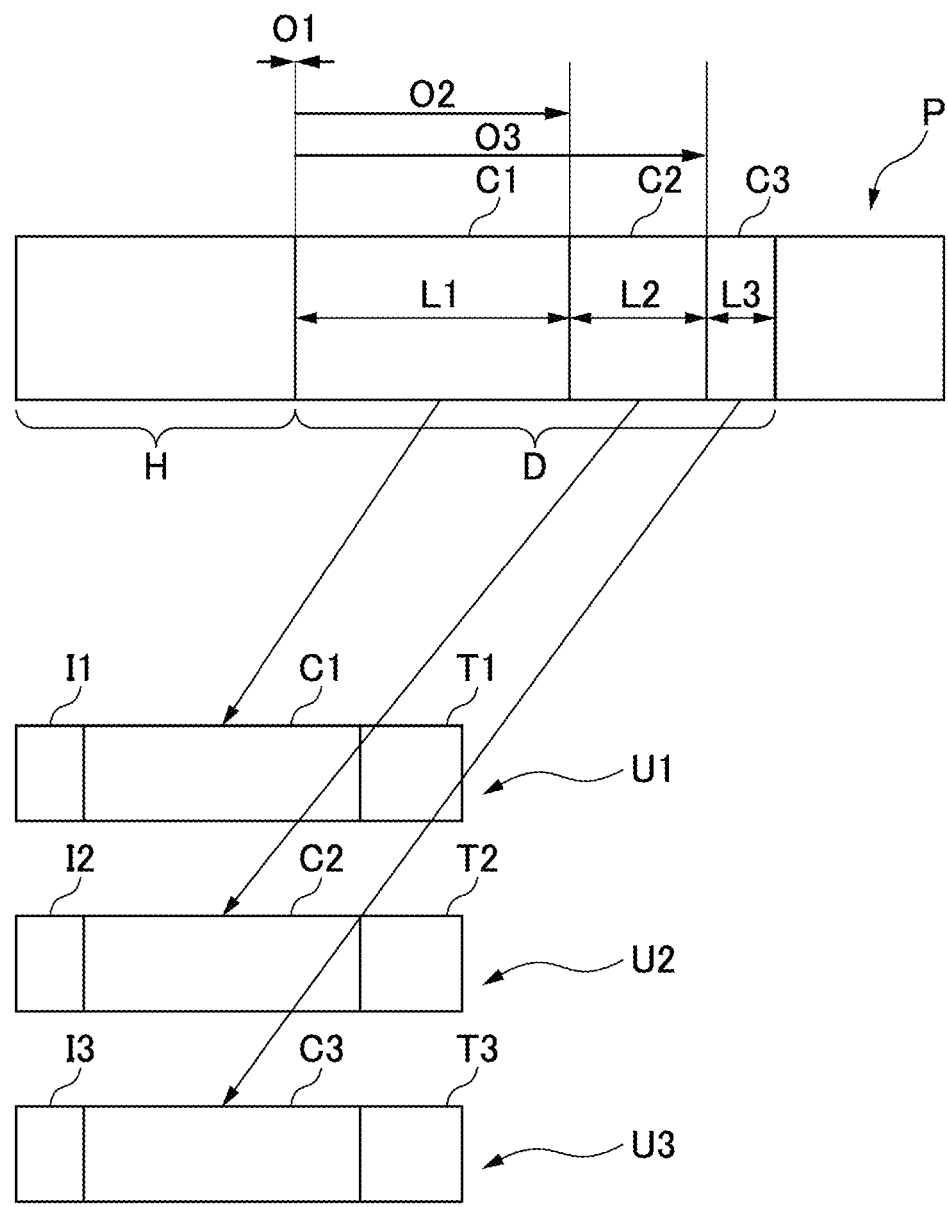
FIG. 5 is a view illustrating an example of data collection and data return.

FIG. 5 is a view illustrating an example of data collection and conversion. Unit data P has a header part H and a data part D. The header part H stores various information related to the unit data P, for example, the type of the unit data P. The data collection method stored in the data part D of the unit data P is specified by the type of the unit data P. As the type of unit data P, for example, there is the ID number of J1939: 1. The value is a predetermined data value allocated to the data part D and is stored in a predetermined region of the data part D. The value is specified by an offset indicating the number of bits from the head of the data part D to the start point of the value and a data length indicating the size of the value. In an example illustrated in FIG. 6, three values C1, C2, and C3 are allocated to the data part D of the unit data P. A value C1 is specified by an offset O1 and a data length L1. A value C2 is specified by an offset O2 and a data length L2. A value C3 is specified by an offset O3 and a data length L3. For example, engine rotation speed is stored in the value C1, for example, engine torque is stored in the value C2, and for example, engine water temperature is stored in the value C3. In addition, the allocation of the values in the data part D is not limited to that illustrated in FIG. 6. For example, the number of the values may be two or less or four or more, and the contents of the respective values may be different from each other.

The format of the unit data handled in communication via a CAN varies depending on the type and model of the control component 12 and the sensor 13. An example of the format of the unit data includes SAE J1939 or the like. Rules for the format of the unit data may be optionally set by a designer. Additionally, in the unit data of the CAN, a plurality of values are set in a data part of up to 8 bytes and stored in a predetermined storage region. For that reason, even when the values of the same type of data are given, there is a possibility that the position and size of the values stored in the data part vary depending on the format of the unit data.

For that reason, the collection method includes the type of the format, the value of the offset and the value of the data length.

The collection unit 112 collects data from the control component 12 or the sensor 13 in accordance with a collection method included in a collection instruction input to the collection instruction input unit 111. Specifically, the collection unit 112 specifies the type of unit data from a header part of the unit data based on a collection method, then specifies a storage region in which the value of a collection target is stored and collects the value stored in the specified storage region from the unit data transmitted from the control component 12 or the sensor 13.

The conversion unit 113 generates a unified data object by converting the data collected by the collection unit 112 into data in a unified format. Specifically, as illustrated in FIG. 6, the conversion unit 113 generates, for each of the plurality of values collected from the unit data P of the data of the CAN, a unified data object that stores the collected value and an identifier indicating the type of data related to the collected value. In the example illustrated in FIG. 6, the conversion unit 113 generates a unified data object U1 based on the value C1, a unified data object U2 based on the value C2, and a unified data object U3 based on the value C3. The unified data object U1 includes an identifier I1 indicating the type of data having the value C1 and a time stamp T1 indicating the acquisition time of the value C1. The unified data object U2 includes an identifier I2 indicating the type of data having the value C2 and a time stamp T2 indicating the acquisition time of the value C2. The unified data object U3 includes an identifier I3 indicating the type of data having the value C3 and a time stamp T3 indicating the acquisition time of the value C3.

The first processor 110 extracts one value from the unit data by referring to the rules for the format of predetermined unit data from a collection method table, and gives an identifier and a time stamp in the unified data format of the value to convert the value, the identifier and the time stamp to one unified data format. By doing so, it is possible to easily utilize the data by associating one identifier with one optional data value and performing data management as the unified data format.

The data output unit 114 outputs the unified data object generated by the conversion unit 113 to the second substrate 200.

The second processor 210 executes a program stored in the second storage 250 to function as a processing condition reception unit 211, a collection determination unit 212, a collection method specification unit 213, a collection instruction output unit 214, a data acquisition unit 215, a collection unit 216, a conversion unit 217, a data registration unit 218, a collectable list notification unit 219, a data transmission unit 220, a collectable list generation unit 221, and a collection method update detection unit 222. Additionally, a storage region for the collection method table 251, the processing condition table 252, the collectable list 253, and the data table 254 is secured in the second storage 250.

FIG. 6 is a view illustrating a data structure of the collection method table 251. In the collection method table 251, for each of the components (control component 12, sensor 13, and extension component 14), an identifier indicating the type of data that is acquirable from the component is stored in association with a data collection method in advance. The data collection method includes, for example, the format of unit data, the offset of a value allocated to a data part of the unit data, the data length of the value, and the like.

In addition, the type of data is not limited to the data acquired by each component from a sensor, for example, may include abnormality data in which each component detects an abnormality, obstacle data in which an obstacle including a person present around the work machine 10 is detected, image data captured by a camera (not illustrated) installed at the work machine 10, external environment data including ambient temperature data and humidity data outside the work machine 10, and current terrain data that is the measurement result of current state terrain around the work machine 10.

FIG. 7 is a view illustrating a data structure of the processing condition table 252. The processing condition table 252 stores an identifier indicating the type of data to be collected by the data collection device 11 and a distribution method, a collection cycle, and a transmission cycle of the data in association with each other. Examples of the distribution method of the data include a PULL method in which a component distributes data by receiving a data request, and a PUSH method in which a component voluntarily distributes data. The PUSH method includes a method in which a component distributes data at each predetermined cycle and a method in which data is distributed when a predetermined event occurs. The collection cycle is a condition defined in a case where the distribution method is PULL. That is, the data collection device 11 transmits a data request to a component at a timing related to the collection cycle. In addition, in another embodiment, the data processing conditions may be further defined in the processing condition table 252. In this case, the processing condition table 252 may further store the processing conditions in association with the identifier.

FIG. 8 is a view illustrating a data structure of the collectable list 253. The collectable list 253 stores identifiers related to all the data that is collectable by the plurality of components mounted on the work machine 10. The collectable list 253 is equivalent to merging all the identifiers associated with the respective components in the collection method table 251. The collectable list 253 may further store the initial values, the minimum values, the maximum values, the collection cycles, and the like of the data.

FIG. 9 is a view illustrating a data structure of the data table 254. The data table 254 stores the data collected by the data collection device 11. The data table 254 includes a raw data table 254A and a time series data table 254B. The raw data table 254A stores the collected unified data object itself. That is, the raw data table 254A stores the identifiers of the data, and the values and the time stamps of the data in association with each other. Since the collection cycle of the data in a PULL format is determined in the processing condition table 252, not all the data are collected in the same cycle. Additionally, there is a possibility that the transmission cycle of the data in a PUSH format data varies for each component. Therefore, the values of the time stamps of the data recorded in the raw data table 254A may not be the same between the plurality of kinds of data. For example, as illustrated in FIG. 9, in the raw data table 254A, the values of the data related to an identifier X1 and an identifier X3 are recorded at time XXXX/XX/XX 00:00:02, but the values of the data related to an identifier X4 and an identifier X9 are not recorded.

For that reason, a unified data object with a uniform time stamp is stored in the time series data table 254B such that the values of the data related to all the identifiers of collection targets can be obtained when one time is specified. That is, the collected unified data object and the unified data object generated by processing the collected unified data object are stored in the time series data table 254B.

The processing condition reception unit 211 receives, from the data server 30, processing condition information that defines collection conditions that are conditions for collecting data related to the work machine 10 and transmission conditions that are conditions for transmitting data related to the work machine 10. The processing condition information related to the collection conditions includes, for example, an identifier indicating the type of data to be collected, and a distribution method and a collection cycle of the data. The collection cycle is defined in a case where the collection method is PULL. The processing condition information related to the transmission condition includes an identifier indicating the type of data to be transmitted and a transmission cycle of the data. In addition, the distribution method may not be stored in the processing condition table 252 but may be stored in the collection method table 251. The processing condition reception unit 211 updates the processing condition table 252 based on the received processing condition information.

The collection determination unit 212 refers to the processing condition table 252 at each timing related to a predetermined processing cycle and determines whether or not there is data to be collected at the current timing. In a case where there is data to be collected, the collection determination unit 212 specifies an identifier of the data to be collected.

The collection method specification unit 213 refers to the collection method table 251 and specifies a data collection method for each identifier specified by the collection determination unit 212. Additionally, the collection method specification unit 213 specifies, for each identifier, whether or not a component that generates data related to the identifier is connected to the first substrate 100 or the second substrate 200.

The collection instruction output unit 214 outputs a data collection instruction to the first substrate 100 for the data generated by a component connected to the first substrate 100, that is, the control component 12 or the sensor 13 among the data to be collected. The collection instruction includes a data identifier and a collection method specified by the collection method specification unit 213.

The data acquisition unit 215 acquires the data collected by the first substrate 100 in accordance with a collection instruction from the first substrate 100. That is, the data acquisition unit 215 acquires a unified data object from the first substrate 100.

The collection unit 216 acquires the data generated by a component connected to the second substrate 200, that is, the extension component 14, among the data to be collected, in accordance with a collection method specified by the collection method specification unit 213.

The conversion unit 217 generates a unified data object by converting the data collected by the collection unit 216 into data in a unified format. Additionally, the conversion unit 217 converts the unified data object into a format related to the communication of the CAN. That is, the conversion unit 217 generates the unit data of the CAN in which values related to a plurality of unified data objects are stored in a data part.

The data registration unit 218 registers a unified data object acquired by the data acquisition unit 215 and a unified data object converted by the conversion unit 217 in the raw data table 254A and the time series data table 254B of the data table 254. Additionally, the data registration unit 218 generates a unified data object related to an identifier that has not been collected at that timing, and registers the unified data object in the time series data table 254B.

The collectable list notification unit 219 notifies the data server 30 of a collectable list. For example, the collectable list notification unit 219 may provide a notification of the collectable list at the timing when the collectable list 253 is updated.

The data transmission unit 220 refers to the processing condition table 252 at each timing related to a processing cycle, reads a unified data object to be transmitted at the current timing from the data table 254, and transmits the unified data object to the data server 30. In addition, the data transmission unit 220 according to another embodiment may transmit the unified data object to a device other than the data server 30. For example, the data transmission unit 220 may transmit the unified data object to a device different from the second substrate 200 included in the data collection device 11. That is, the data transmission unit 220 transmits the unified data object to the outside.

Additionally, the data transmission unit 220 outputs the unit data generated by the conversion unit to the extension component 14 depending on the request of the extension component 14.

The collectable list generation unit 221 generates and updates the collectable list 253 by using part of the data recorded in the collection method table 251 for each component, which is recorded in the second storage 250. When the collectable list 253 is generated and updated by the collectable list generation unit 221, the collectable list notification unit 219 notifies the data server 30 of a collectable list based on the newly updated collectable list 253.

The collection method update detection unit 222 detects the update of the collection method table 251. The collection method update detection unit 222 according to the present embodiment detects the update of the collection method table 251 in a case where new collection method information is added to the collection method table 251 by the operator. The collection method information is, for example, information indicating the type of data that is acquirable from a new component and a collection method for acquiring the data, in a case where the new component is mounted on the work machine 10.

Here, a procedure in a case where the operator intends to mount a new component on the work machine 10 will be briefly described. The operator connects the component to be newly mounted to a predetermined spot in the work machine 10. For example, in a case where the new component to be mounted on the work machine 10 is the control component 12 or the extension component 14, the operator connects the component to a corresponding network (first network N1 or second network N2). In a case where the new component to be mounted on the work machine 10 is the sensor 13, the operator connects the component to the first interface 170. After that, the operator performs the processing of adding collection method information about the connected new component to the collection method table 251 via a predetermined service tool connected to the service tool interface 290. The service tool is a terminal device that a serviceman or a seller connects to the work machine 10, and may be a dedicated terminal or a general-purpose PC. The service tool is an example of an external device outside the vehicle.

(Configuration of Data Server 30)

Figure 10:
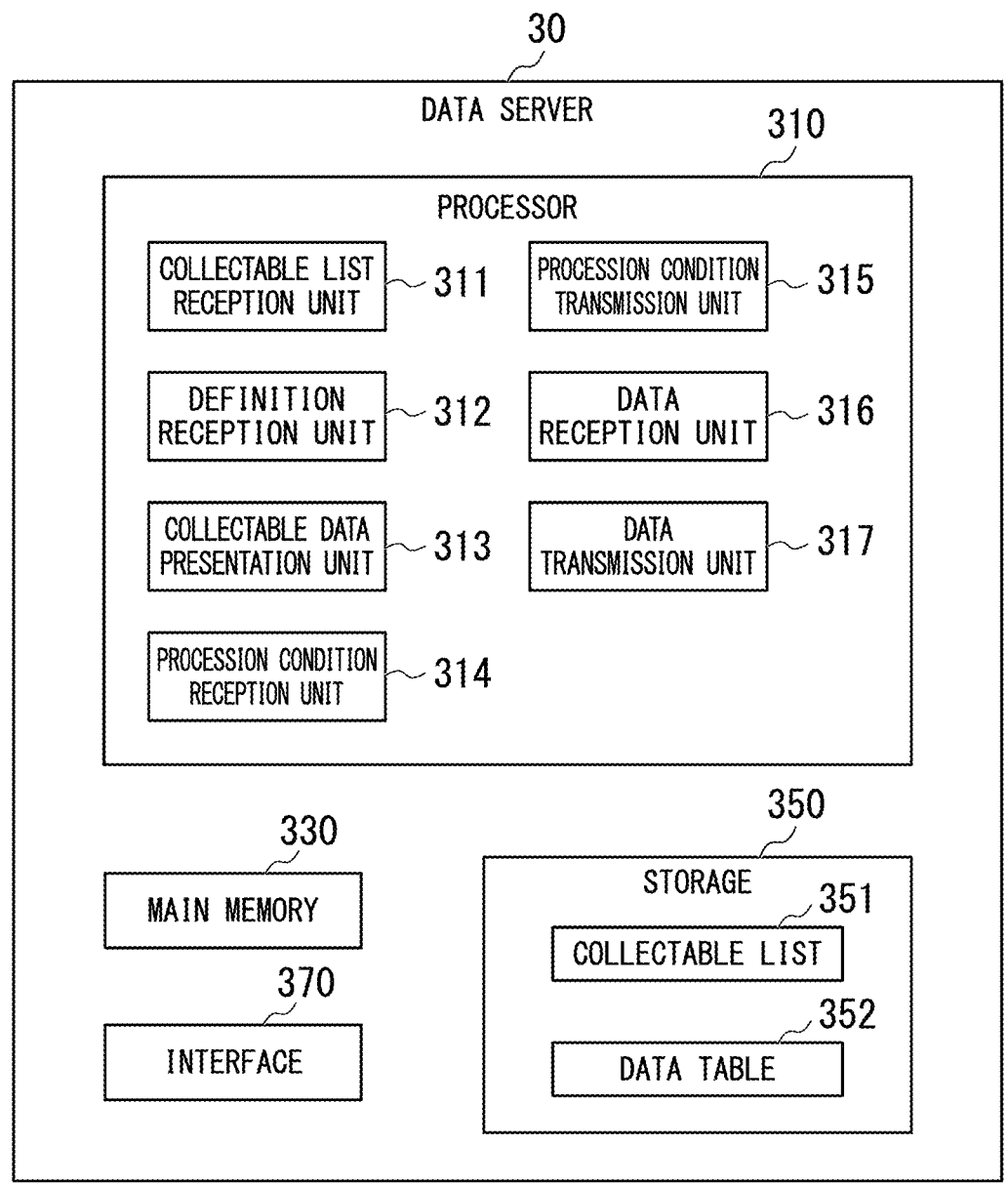
FIG. 10 is a block diagram illustrating a configuration of a data server according to the first embodiment.

FIG. 10 is a block diagram illustrating a configuration of the data server 30 according to the first embodiment.

The data server 30 includes a processor 310, a main memory 330, a storage 350, and an interface 370. The processor 310 reads a program from the storage 350, develops the program into the main memory 330, and executes predetermined processing in accordance with the program. The interface 370 is communicably connected to the data collection device 11, the definition database 50, and the user device 70.

The program stored in the storage 350 may be for realizing some of the functions exhibited by the data server 30. Additionally, in another embodiment, the data server 30 may include a custom LSI such as a PLD in addition to or instead of the above configuration. In this case, some or all of the functions realized by the data server 30 may be realized by the integrated circuit.

Examples of the storage 350 include HDDs, SSDs, magnetic disks, magneto-optical disks, CD-ROMs, DVD-ROMs, semiconductor memories, and the like. The storage 350 may be an internal medium directly connected to a bus line or an external medium connected to the data server 30 via the interface 370 or a communication line. Additionally, this program may be distributed to the data server 30 via a communication line, and the processor 310 may execute the program. In at least one embodiment, the storage 350 is a non-transitory tangible storage medium.

When the processor 310 executes a program stored in the storage 350, the processor 310 functions as a collectable list reception unit 311, a definition reception unit 312, a collectable data presentation unit 313, a processing condition reception unit 314, a processing condition transmission unit 315, a data reception unit 316, and a data transmission unit 317. Additionally, the storage 350 secures a storage region for the collectable list 351 and the data table 352.

The collectable list 351 stores identifiers related to all the data that is collectable in the plurality of work machines 10. That is, the collectable list 351 stores the machine IDs of the work machines 10 and identifiers of the data in association with each other.

The data table 352 stores unified data objects respectively transmitted from the plurality of work machines 10. That is, the data table 352 stores the machine IDs of the work machines 10, the identifiers of the data, the values of the data, and the time stamps of the data in association with each other.

The collectable list reception unit 311 receives a collectable list from the data collection device 11 of the work machine 10. The collectable list reception unit 311 updates the collectable list 351 based on the received collectable list.

The definition reception unit 312 receives definition information indicating the definition of the data related to an identifier of a unified data object from the definition database 50. The definition information includes at least a display name and description of the data. The display name of the data is, for example, a character string expressed in a natural language such as "engine rotation speed". The definition information will be described below.

The collectable data presentation unit 313 presents to the user device 70 a collectable data list for each work machine 10 stored in the collectable list 351. In this case, the collectable data list generated by the collectable data presentation unit 313 includes the display name and the description included in the definition information. Accordingly, a user can understand the meaning of the data that the work machine 10 can collect. More specifically, the collectable data presentation unit 313 receives the input of the machine ID of the work machine 10 from the user device 70 and present a data list which is collectable by the work machine 10 together with an input form for the processing condition information, to the user device 70.

The processing condition reception unit 314 receives the processing condition information from the user device 70. The user inputs the processing condition information based on the list presented by the collectable data presentation unit 313. The input processing condition information is associated with the machine ID. In a case where the input processing condition information is defined by the display name, the processing condition reception unit 314 replaces the display name with an identifier based on the definition information acquired by the definition reception unit 312.

The processing condition transmission unit 315 transmits the processing condition information input to the processing condition reception unit 314 to the data collection device 11 related to the associated machine ID.

The data reception unit 316 receives a unified data object from the data collection device 11.

The data transmission unit 317 transmits the received unified data object and the definition information related to the unified data object to the user device 70. Accordingly, when the data related to the unified data object is displayed, the user device 70 can display the display name and the like included in the definition information together. In this case, the data transmission unit 317 may replace the identifier related to the unified data object with the display name included in the definition information or may add the display name and the description to the unified data object.

(Definition Database 50)

FIG. 11 is a view illustrating an example of the information stored in the definition database 50 according to the first embodiment.

The definition database 50 stores the definition information of data to which an identifier is given in association with the identifier in a unified format. The definition information includes the display name, description, tag, data type, size, unit, gain, offset, and access authority for each user type. The display name and the description are a name and a description for the user to recognize the type of data. The tag is a character string indicating a keyword used in a data search. Examples of the access authority include access prohibition (– –), read-only (r–), and readable/writable (rw). Examples of the user type include an administrator (Admin authority), a user (User authority), and the like. Other user types may include developers, service providers, sellers, and the like.

The user can narrow down the types of data by the display name, the description, and the tag, and determine whether or not the work machine 10 that is a data collection target can collect targeted data. Additionally, the user can develop an application program for processing the data by referring to the data type, size, unit, gain, and offset.

(Method of Setting Processing Conditions)

Figure 12:
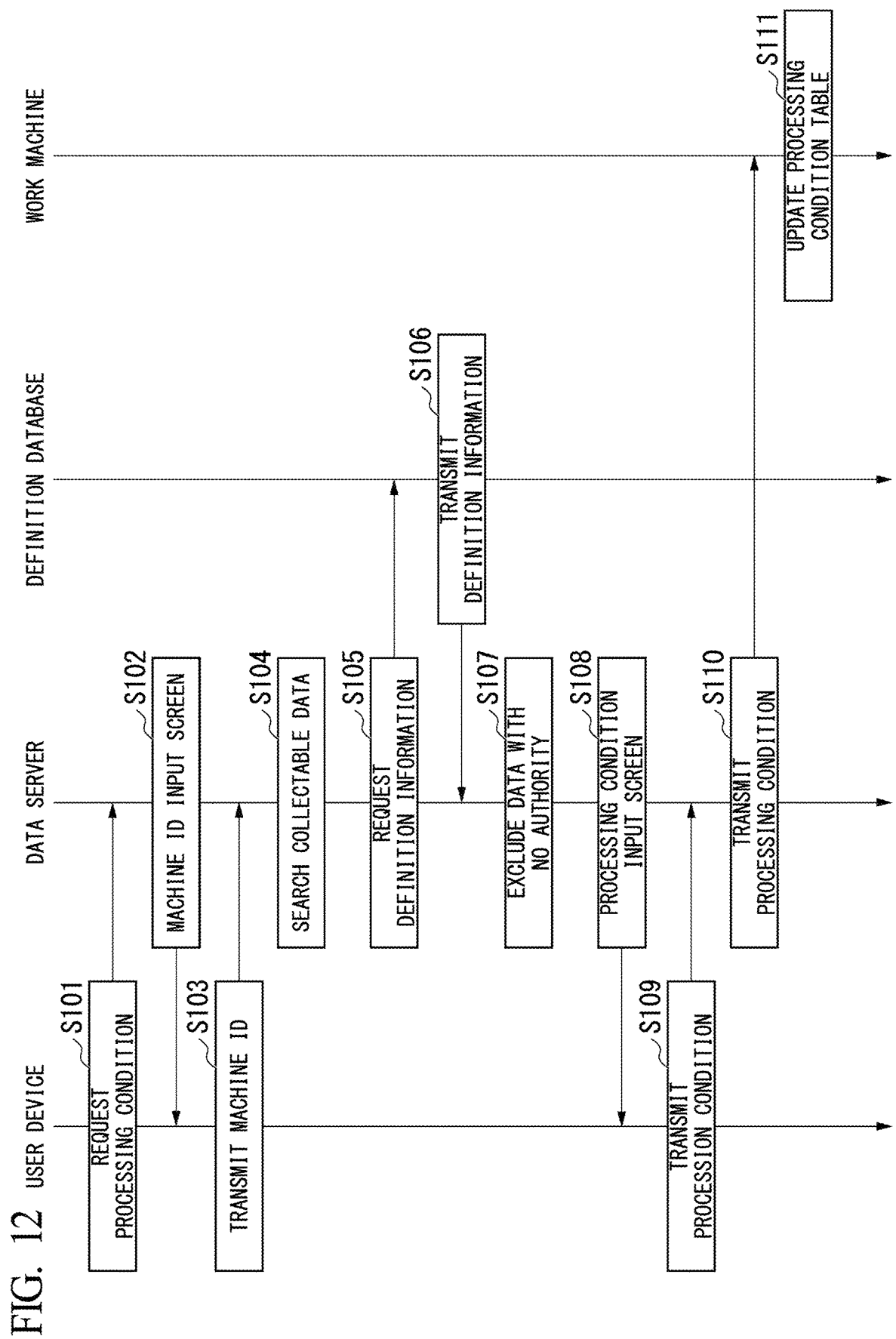
FIG. 12 is a sequence view illustrating a method of setting processing conditions in the data providing system according to the first embodiment.

FIG. 12 is a sequence view illustrating a method of setting processing conditions in the data providing system 1 according to the first embodiment.

First, the user operates the user device 70 to access the data server 30. In this case, the user logs in to the data server 30 with his/her own preset account. A user type is allocated to the account in advance.

The user device 70 transmits a request for setting processing conditions to the data server 30 (Step S101). When the data server 30 receives the request for setting the processing conditions, the collectable data presentation unit 313 causes the user device 70 to display an input screen for the machine ID of the work machine 10 that is a setting target (Step S102). The input screen may be one in which the machine ID is directly input to a text box, or the machine ID may be selected from a list box.

The user inputs the machine ID of the work machine 10, which is the setting target, in accordance with the displayed input screen. The user device 70 transmits the input machine ID to the data server 30 (Step S103).

When the collectable data presentation unit 313 receives the machine ID from the user device 70, the collectable data presentation unit 313 refers to the collectable list 351 and searches for identifiers included in a collectable list associated with the received machine ID (Step S104). The definition reception unit 312 transmits a request for definition information related to the identifiers in the collectable list specified by the search to the definition database 50 (Step S105). The definition database 50 transmits the definition information associated with the identifiers to the data server 30 in accordance with the request received from the data server 30 (Step S106). The collectable data presentation unit 313 refers to the received definition information and excludes identifiers that cannot be read by the authority of a logged-in user from the searched identifiers (Step S107). Based on the received definition information, the collectable data presentation unit 313 generates a processing condition input screen including display names and descriptions of all data that is collectable and can be read by the user, whether or not to collect the data, and an input form for collection conditions and transmission conditions and causes the user device 70 to display the processing condition input screen (Step S108).

The user refers to the processing condition input screen displayed on the user device 70 and inputs the necessity of collection of each data to the input form associated with the data. For the data that needs to be collected, the user inputs the collection conditions and the transmission conditions to the input form associated with the data.

The user device 70 transmits the input processing condition information to the data server 30 (Step S109). When the processing condition reception unit 314 receives the processing condition information from the user device 70, the processing condition transmission unit 315 transmits the received processing condition information to the data collection device 11 related to the machine ID transmitted in Step S3 (Step S110).

The processing condition reception unit 211 of the data collection device 11 updates the processing condition table 252 based on the received processing condition information (Step S111).

Accordingly, the processing conditions specified by the user can be set in the work machine 10 that is the setting target.

Figure 13:
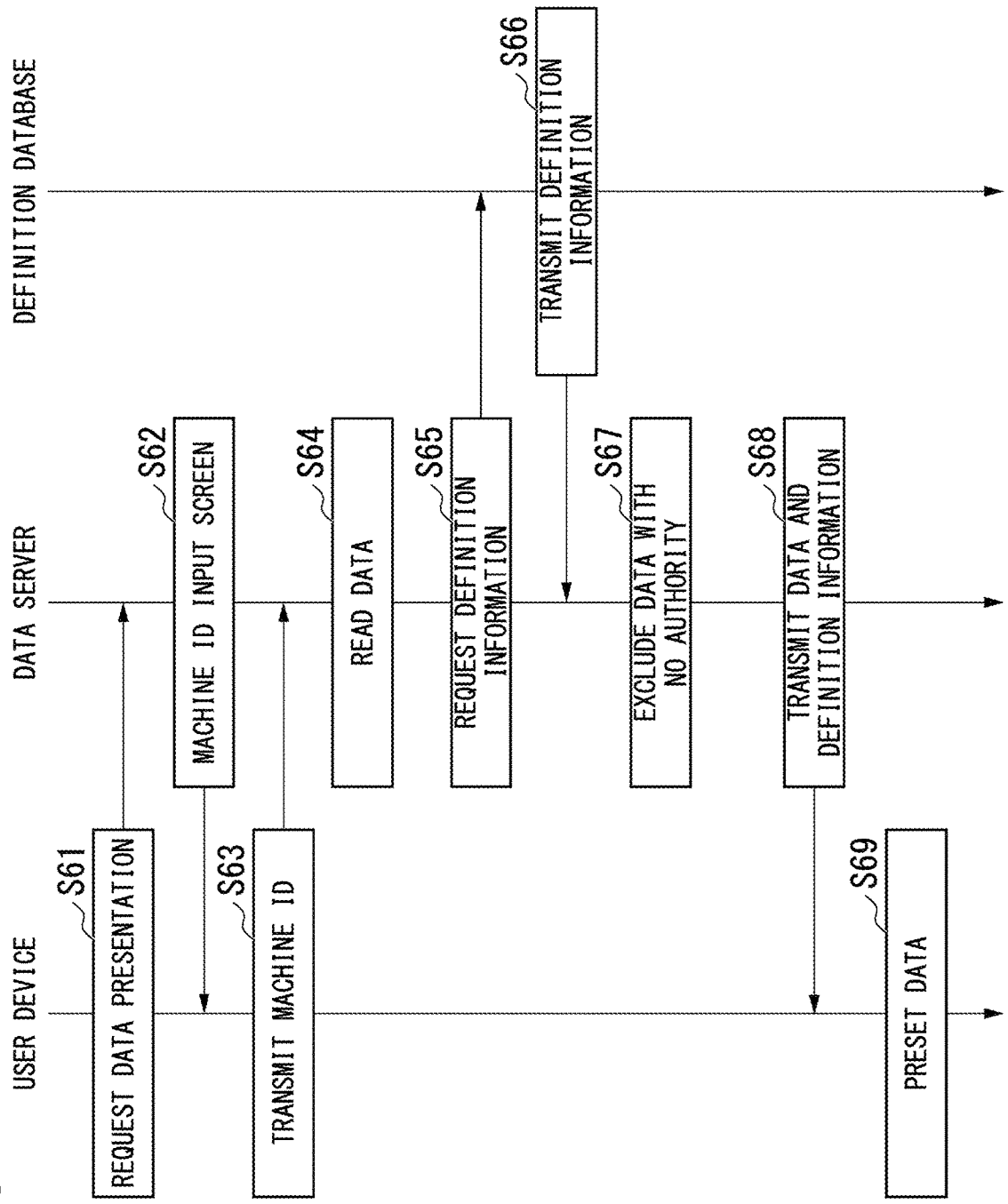
FIG. 13 is a sequence view illustrating a method of presenting data in the data providing system according to the first embodiment.

FIG. 13 is a sequence view illustrating a method of presenting data in the data providing system 1 according to the first embodiment.

First, the user operates the user device 70 to access the data server 30. In this case, the user logs in to the data server 30 with his/her own preset account. A user type is allocated to the account in advance.

The user device 70 transmits a data presentation request to the data server 30 (Step S61). When the data server 30 receives the data presentation request, the data transmission unit 317 causes the user device 70 to display the input screen of the machine ID of the work machine 10 that is a presentation target (Step S62). The input screen may be one in which the machine ID is directly input to a text box, or the machine ID may be selected from a list box. The input screen may be capable of receiving selection of a plurality of machine IDs.

The user inputs the machine ID of the work machine 10, which is the setting target, in accordance with the displayed input screen. The user device 70 transmits the input machine ID to the data server 30 (Step S63).

When the data transmission unit 317 receives the machine ID from the user device 70, the data transmission unit 317 refers to the data table 352 and searches for unified data objects associated with the received machine ID (Step S64). That is, the data transmission unit 317 searches for the data that is actually collected. The definition reception unit 312 transmits a request for definition information related to identifiers of unified data objects specified by the search to the definition database 50 (Step S65). The definition database 50 transmits the definition information associated with the identifiers to the data server 30 in accordance with the request received from the data server 30 (Step S66).

The data transmission unit 317 refers to the received definition information and excludes unified data objects that cannot be read by the authority of a logged-in user from the searched unified data objects (Step S67). The data transmission unit 317 transmits the unified data objects related to the data that can be read by the authority of the logged-in user and the definition information related to the unified data objects to the user device 70 (Step S68). When the user device 70 receives the unified data objects and the definition information from the data server 30, the user device 70 displays the received unified data objects and the definition information (Step S69). For example, the user device 70 may replace the identifier included in the unified data object with a display name related to the definition information and display the replaced display name. Accordingly, the user device 70 can acquire the data collected from the work machine 10 related to the specified machine ID.

(Automatic Update Processing of Collectable List)

Figure 14:
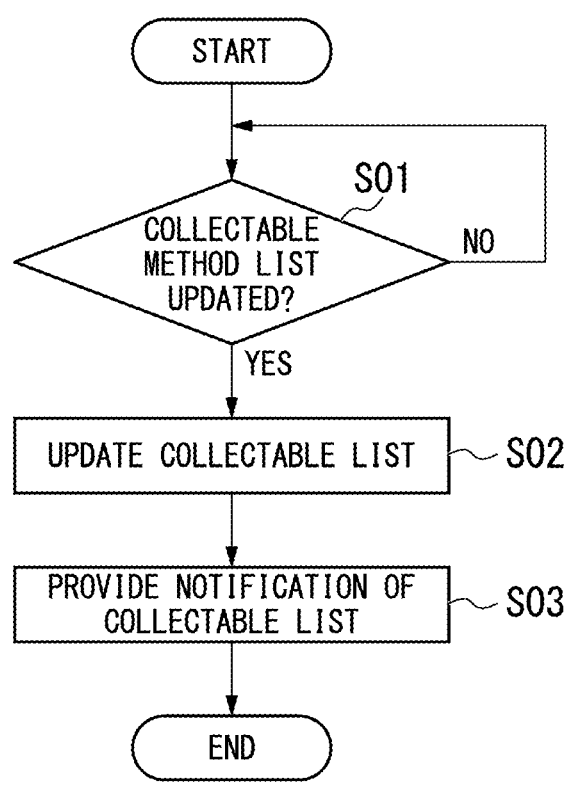
FIG. 14 is a view illustrating a processing flow executed by a data collection device according to the first embodiment.

FIG. 14 is a view illustrating a processing flow executed by the data collection device 11 according to the first embodiment.

Figure 16:
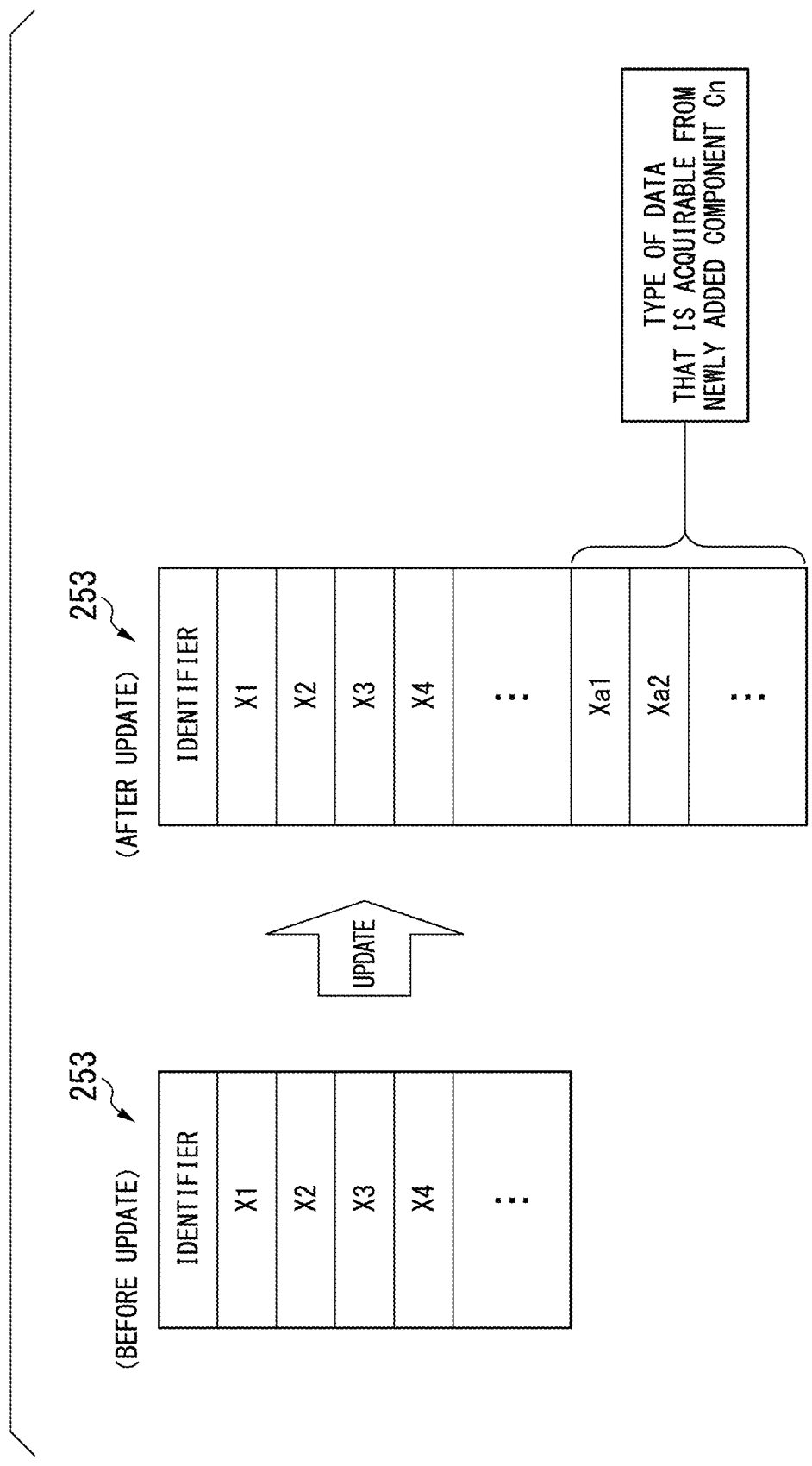
FIG. 16 is a view for explaining the processing of the data collection device according to the first embodiment in detail.

Additionally, FIGS. 14 and 16 are views for explaining the processing of the data collection device 11 according to the first embodiment in detail.

Hereinafter, the processing flow executed by the data collection device 11 will be described in detail with reference to FIGS. 14 to 16.

The processing flow illustrated in FIG. 14 may be steadily and repeatedly executed while the data collection device 11 is started.

In the processing flow illustrated in FIG. 14, first, the collection method update detection unit 222 determines whether or not the collection method table 251 has been updated (Step S01). In a case where the collection method table 251 is not updated (Step S01: NO), the collection method update detection unit 222 repeatedly executes the determination processing of Step S01 until the collection method table 251 is updated.

Here, with reference to FIG. 14, the processing performed by the operator when a new component is added will be described in detail.

After the new component is connected to the first network N1, the second network N2, or the first interface 170, the operator adds information about the new component to the collection method table 251 via a predetermined service tool. Adding the information about the new component to the collection method table 251 is an example of updating the collection method table 251. Here, it is assumed that the operator has added a new component Cn to a certain work machine 10. In this case, the operator adds collection method information 251$n$ about the component Cn to the collection method table 251 via a service tool connected to the service tool interface 290. As illustrated in FIG. 14, the types of data (identifiers Xa1, Xa2, and the like) that is collectable from the newly added component Cn and a collection method for acquiring the data are stored in the collection method information 251*n*.

Returning to FIG. 14, when new information is added to the collection method table 251 through the operation of the operator, the collection method update detection unit 222 determines that the collection method table 251 has been updated (Step S01: YES).

In a case where it is determined that the collection method table 251 has been updated, the collectable list generation unit 221 updates the collectable list 253 based on the updated collection method table 251 (Step S02).

Here, the processing of Step S02 will be described in detail with reference to FIG. 16.

In the processing of Step S02, the collectable list generation unit 221 merges all identifiers associated with each component of the collection method table 251. As a result, as illustrated in FIG. 16, identifiers Xa1, Xa2, and the like indicating the types of data that is acquirable from the component Cn (FIG. 15) newly mounted on the work machine 10 are included in the updated collectable list 253.

Returning to FIG. 14, when the collectable list 253 is updated by the collectable list generation unit 221, the collectable list notification unit 219 notifies the data server 30 of the newly updated collectable list 253 (Step S03). This collectable list is received by the collectable list reception unit 311 of the data server 30. The data server 30 updates the collectable list 351 in the data server 30 based on the collectable list received from the data collection device 11.

(Action and Effect)

As described above, the data collection device 11 according to the first embodiment is a data collection device that collects data that is collectable from each component mounted on the work machine 10. The data collection device 11 includes the collectable list generation unit 221 that generates and updates the collectable list 253 indicating the types of data that is collectable from the work machine 10, based on the collection method table 251 in which the types of data that is acquirable from each component and the collection method for acquiring the data are stored. Additionally, the data collection device 11 includes the collectable list notification unit 219 that transmits the collectable list 253 to the data server 30.

According to such a configuration, in a case where the types of data that is acquirable from the work machine 10 have changed due to the addition of a new component or the like, the collectable list generation unit 221 updates the collectable list 253 based on the data stored in the collection method table 251. Then, the collectable list notification unit 219 transmits the newly updated collectable list 253 to the data server 30. Accordingly, the collectable list 351 indicating the types of data that is collectable from the work machine 10 is always kept up to date on the data server 30 side. Thus, the consistency between the contents of the collectable list 351 recorded in the data server 30 and the types of data that is actually acquirable from the work machine 10 are guaranteed.

Additionally, the data collection device 11 according to the first embodiment further includes the collection method update detection unit 222 that detects the update of the collection method table 251. Then, in a case where the update of the collection method table 251 is detected, the above-described collectable list generation unit 221 updates the collectable list 253 based on the data stored in the updated collection method table 251.

According to such a configuration, for example, in a case where the contents of the collection method table 251 are changed via a service tool, the collection method update detection unit 222 immediately detects that the collection method table 251 has been updated. Then, in a case where the update of the collection method table 251 is detected, the collectable list generation unit 221 updates the collectable list 253 based on a new collection method table 251 after the update. Accordingly, in a case where the types of data that is acquirable from the work machine 10 have changed due to the addition of a new component, the deletion of an existing component, the update of an existing component, or the like, the collectable list 253 is immediately synchronized and updated. Therefore, it is possible to reduce a time zone where a discrepancy occurs between the contents of the collectable list 253 recorded in the data collection device 11 and the types of data that is actually acquirable from the work machine 10. That is, it is possible to ensure the simultaneity between the contents of the collectable list 253 recorded in the data collection device 11 and the types of data that is actually acquirable from the work machine 10.

Additionally, the collectable list notification unit 219 transmits the updated collectable list 253 to the data server 30 at the timing when the collectable list 253 is updated.

According to such a configuration, in a case where the collectable list 253 is updated, a list of types of data shown in the updated collectable list 253 is immediately transmitted to the data server 30. Therefore, it is possible to reduce the time zone where a discrepancy occurs between the contents of the collectable list 351 recorded in the data server 30 and the types of data that is actually acquirable from the work machine 10.

Additionally, the data collection device 11 according to the first embodiment further includes the data transmission unit 317 that transmits the data collected based on the processing condition information received from the data server 30 to the data server 30.

By doing so, the user can customize the types and the transmission cycle of data to be collected from the work machine 10 as desired by utilizing the processing condition information.

Here, the collectable list 351 stored in the data server 30 reflects the contents of a collectable list received from the data collection device 11 mounted on the work machine 10. That is, the contents of the collectable list 351 stored in the data server 30 are consistent with the types of data that is actually acquirable from the work machine 10. Therefore, the user can prepare the processing condition information of which the consistency with the work machine 10 at the present point is guaranteed.

Second Embodiment

Hereinafter, a data collection device according to a second embodiment and a data providing system including the data collection device will be described in detail with reference to FIGS. 17 and 18.

(Configuration of Work Machine 10)

FIG. 17 is a block diagram illustrating a configuration of the work machine 10 according to the second embodiment.

The second processor 210 of the work machine 10 according to the second embodiment has further functions as a connection detection unit 223 and a collection method update processing unit 224 in addition to the functions of the second processor 210 according to the first embodiment.

In addition, the control component 12, the sensor 13, and the extension component 14 according to the second embodiment each include a non-volatile storage region inside, and the collection method information 251*n* is recorded in the storage region. The collection method information 251*n* is information indicating the types of data that is acquirable from each component and a collection method for acquiring the data.

In addition, in the present embodiment, it is assumed that the collection method information 251*n* corresponding to the new component is also stored in advance in a component newly connected to the work machine 10 after shipment.

In a case where when a new component is connected to the first network N1, the second network N2, or the like by the operator, the connection detection unit 223 detects the connection.

In a case where the connection detection unit 223 detects that the new component is connected, the collection method update processing unit 224 reads collection method information from the new component. The collection method update processing unit 224 updates the collection method table 251 recorded in the second storage 250 based on the collection method information read from the storage region of the new component. The collection method update processing unit 224 is an example of the collectable list generation unit.

(Automatic Update Processing of Collectable List)

Figure 18:
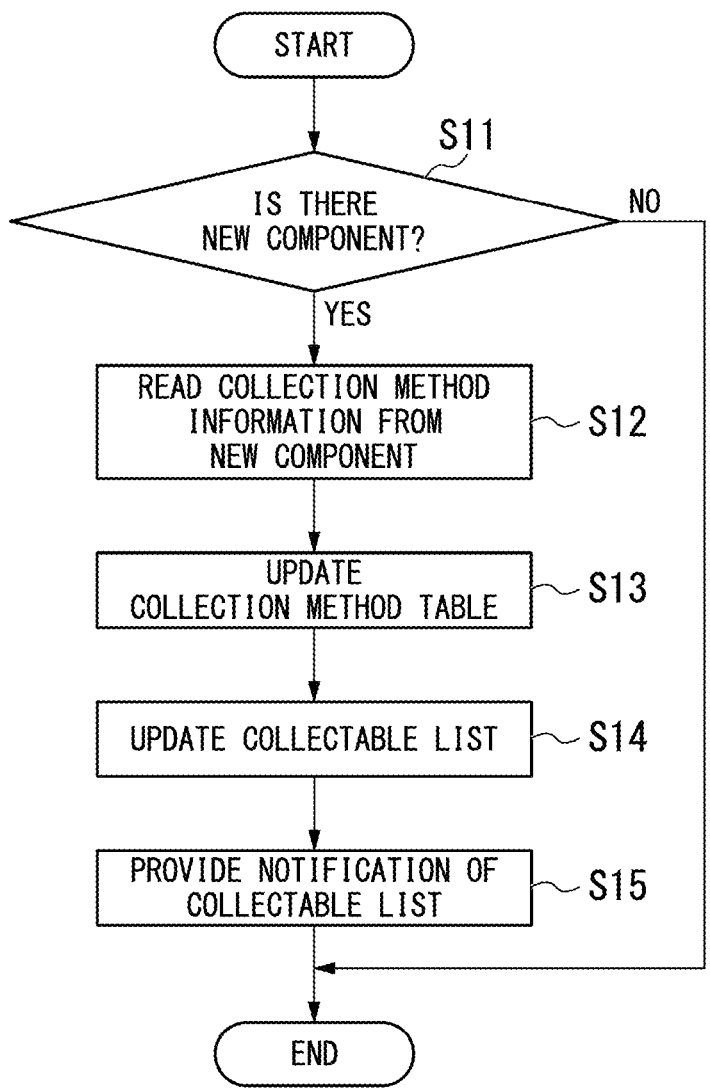
FIG. 18 is a view illustrating a processing flow executed by the data collection device according to the second embodiment.

FIG. 18 is a view illustrating a processing flow executed by the data collection device 11 according to the second embodiment.

Hereinafter, the processing flow executed by the data collection device 11 will be described in detail with reference to FIG. 18.

The processing flow illustrated in FIG. 18 may be executed, for example, during the startup processing executed when power is applied to the data collection device 11.

In the processing flow illustrated in FIG. 18, first, the connection detection unit 223 communicates with respective components connected to the first network N1, the second network N2, and the like, and determines whether or not a newly connected component is present (Step S11). In a case where no new component is connected (Step S11; NO), the data collection device 11 ends without performing any special processing.

In a case where a new component is connected (Step S11; YES), the collection method update processing unit 224 reads the collection method information 251*n* from the storage region of the new component (Step S12). The collection method information 251*n* is equivalent to the collection method information that the operator has manually added to the collectable list 253 by using a service tool in the first embodiment (refer to FIG. 15). Subsequently, the collection method update processing unit 224 adds the collection method information 251*n* read in Step S12 to the collection method table 251 of the second storage 250 and updates the collection method table 251 (Step S13).

The collectable list generation unit 221 updates the collectable list 253 based on the collection method table 251 updated in Step S13 (Step S14). Then, the collectable list notification unit 219 notifies the data server 30 of the newly updated collectable list 253 (Step S15). The processing of steps S14 and S15 is the same as that of steps S02 and S03 in FIG. 14 of the first embodiment.

(Action and Effect)

As described above, the data collection device 11 according to the second embodiment includes the connection detection unit 223 for detecting the connection of a new component. Additionally, the data collection device 11 includes the collection method update processing unit 224 that, in a case where the connection of a new component is detected, acquires the collection method information 251*n* stored in advance in the new component and updates the collection method table 251 based on the acquired collection method information 251*n*.

According to such a configuration, in a case where a new component is additionally mounted on the work machine 10, the connection detection unit 223 detects the event. Then, in a case where it is detected that a new component is mounted, the collection method update processing unit 224 reads the collection method information 251*n* corresponding to the new component and automatically updates the collection method table 251. Therefore, the same effects as those of the first embodiment can be obtained as well as the effort of the operator manually updating the collection method table 251 by using a service tool in the first embodiment is eliminated.

Other Embodiments

Although the data collection device 11 according to the first embodiment and the second embodiment and the data providing system 1 including the data collection device 11 have been described above, the other embodiments are not limited to the above-described aspects.

In the first and second embodiments, the flow of the processing in which the data collection device 11 notifies the data server 30 of a new collectable list in a case where a new component is mounted on the work machine 10 has been described. However, the processing in which the data collection device 11 according to the first and second embodiments notifies the data server 30 of a collectable list is not limited to this aspect.

For example, after the work machine 10 is shipped, a software or firmware version for an existing component may be upgraded or a sensor may be newly attached, and the types of data that is acquirable from the existing component may increase. Even in this case, the information about the version-upgraded existing component in the collection method table 251 is updated. The collectable list generation unit 221 updates the collectable list 253 along with the update. Then, the collectable list notification unit 219 transmits a new acquirable list to the data server 30.

Additionally, in a case where a component is removed from the work machine 10, it is impossible to collect the types of data that is acquirable from the component. Even in this case, the information about the removed existing component in the collection method table 251 is deleted. In addition, deleting the information about the removed existing component in the collection method table 251 is an example of updating the collection method table 251. Along with the deletion, the collectable list generation unit 221 updates the collectable list 253. Then, the collectable list notification unit 219 transmits a new acquirable list to the data server 30.

Additionally, although described that the data collection device 11 according to the first and second embodiments prepares the collectable list 253 based on the updated collection method table 251 and provides a notification of the collectable list 253 in a case where the collection method table 251 is updated, other embodiments are not limited to this aspect.

For example, the data collection device 11 according to another embodiment may notify the data server 30 of the updated collection method table 251 itself in a case where the collection method table 251 is updated. In this case, it is assumed that the data server 30 prepares and updates the collectable list 351 based on the collection method table 251 received from the data collection device 11. In this case, the collection method table 251 transmitted by the data collection device 11 corresponds to a list of types of data that is collectable from the work machine 10.

Additionally, although described that the data collection device 11 according to the first embodiment immediately updates the collectable list 253 based on the collection method table 251 in a case where the collection method table 251 in the data collection device 11 is updated, other embodiments are not limited to this aspect.

That is, an aspect may be adopted in which the data collection device 11 according to the other embodiments periodically updates the collectable list 253 based on the collection method table 251 regardless of the event that the collection method table 251 is updated. Additionally, as an example of "periodical", an aspect may be adopted in which the collectable list 253 is updated based on the collection method table 251 when the data collection device 11 is started by the key-on of the work machine 10.

Similarly, although described that the data collection device 11 according to the first and second embodiments transmits the types of data shown in the collectable list 253 to the data server 30 immediately in a case where the collectable list 253 in the data collection device 11 is updated, other embodiments are not limited to this aspect.

That is, an aspect may be adopted in which the data collection device 11 according to the other embodiments periodically transmits a list of types of data shown in the collectable list 253 to the data server 30 regardless of the event that the collectable list 253 has been updated. Additionally, as an example of "periodical", an aspect may be adopted in which a list of types of data shown in the collectable list 253 is transmitted to the data server 30 when the data collection device 11 is started by the key-on of the work machine 10.

Additionally, although the first and second embodiments have been described that the sensor 13 that is an example of a component has been described as being connected to the first interface 170. However, other embodiments are not limited to this aspect. For example, the sensor 13 may be connected to the second interface 270 instead of the first interface 170 or may be connected to the control component 12 or the extension component 14. Similarly, the extension component 14 may be connected to another extension component 14 or the control component 12 may be connected to another control component 12.

Additionally, although the first and second embodiments have been described that, in a case where the collection method is updated, the collectable list is updated based on the updated collection method, other embodiments are not limited to this aspect. For example, the data collection device 11 may not have a collection method, may store a collectable list in advance and may directly update the data that can be newly acquired by the update and the data that can no longer be collected in the collectable list in a case where each component is updated.

Additionally, although the first embodiment has been described that the collection method table 251 is updated by using a service tool connected to the data collection device 11 and the second embodiment has been described that the collection method table 251 is updated in a component based on the data collection methods that are recorded in advance, other embodiments are not limited to these aspects.

For example, the data collection device 11 according to another embodiment may receive the collection method information 251n related to a specific component from the data server 30 and update the collection method table 251 based on the received collection method information 251n.

Additionally, an aspect may be adopted in which the data collection device 11 according to another embodiment receives the collection method information 251n from the service tool via a wireless LAN, not via the service tool interface 290.

Additionally, in another embodiment, software or firmware for a predetermined component is rewritten remotely via a wide area communication network. In this case, an aspect may be adopted in which the collection method table 251 is updated based on the collection method information 251n about a predetermined component simultaneously with the rewriting of the software or firmware for the predetermined component.

In addition, the above-described process of various processing of the data collection device is stored in a computer-readable recording medium in the form of a program, and the above various processing is performed as a computer reads and executes this program. Additionally, the computer-readable recording medium refers to a magnetic disk, a magneto-optical disk, a CD-ROM, a DVD-ROM, a semiconductor memory, or the like. Additionally, this computer program may be distributed to a computer via a communication line, and the computer receiving the distribution may execute the program.

The above program may be for realizing some of the above-described functions. Moreover, the above program may be a so-called differential file, differential program, or the like that can realize the above-described functions in combination with a program already recorded in a computer system.

Although the embodiments of the present invention have been described above, these embodiments are presented as examples and are not intended to limit the scope of the invention. These embodiments can be implemented in other various forms, and various omissions, substitutions, and changes can be made without departing from the spirit of the invention. These embodiments and modifications thereof are included in the invention described in the claims and the equivalents thereof as well as being included in the scope and spirit of the invention.

According to the present invention, the type of data registered in a collectable list of an external device can be matched with the type of data that is actually collectable from each work machine.

The invention claimed is:

1. A data collection device of a work machine, the data collection device being mounted on the work machine and configured to collect data that is collectable from at least one existing component mounted on the work machine, the data collection device comprising:
   a processor;
   a storage; and
   an interface configured to be connected to at the least one existing component,
   the processor being configured to
      generate a collectable list indicating a type of first data that is collectable from the at least one existing component, the collectable list being generated based on a collection method table in which collection method information is stored with respect to each of the at least one existing component, the collection method information including an identifier indicating the type of the first data and a collection method for collecting the first data, detect whether one of the at least one existing component has been removed from the work machine and whether a new component has been connected to the interface, upon detecting that the new component has been connected, acquire new collection method information indicating a type of second data that is acquirable from the new component and a collection method for the second data, and add the new collection method information to the collection method table, upon detecting that one of the at least one existing component has been removed, remove existing collection method information indicating a type of third data that is acquirable from the one of the at least one existing component and a collection method for the third data from the collection method table, update the collectable list based on the collection method table when the new collection method information has been added or the existing collection method information has been removed, transmit the collectable list to an external device outside the work machine when the collectable list has been updated.

2. The data collection device of a work machine according to claim 1, wherein in a case in which the at least one existing component mounted on the work machine is updated, the collectable list generation unit updates the collectable list.

3. The data collection device of a work machine according to claim 1, wherein in a case in which the collectable list is updated, the collectable list notification unit transmits an updated collectable list to the external device.

4. The data collection device of a work machine according to claim 1, wherein the processor is further configured to transmit data to the external device based on processing condition information received from the external device, the processing condition information defining conditions related to collection of the data from the work machine.

5. A data providing system for a work machine including the data collection device of a work machine according to claim 1, wherein the external device is a data server, the data server being configured to receive the collectable list from the data collection device, present data that is collectable from the work machine to the outside based on the collectable list, and transmit, to the work machine, a collection condition set based on the data that is collectable.

6. The data collection device of a work machine according to claim 1, wherein the at least one existing component and the new component are connected to the interface via a network.

7. The data collection method of a work machine according to claim 6, wherein the collection method includes a format type, an offset value, and a data length for extracting a unified data object corresponding to each of the at least one existing component and the new component from a unit data of the network.

8. A data collection method for a work machine in which a data collection device mounted on the work machine is used to collect data that is collectable from at least one existing component mounted on the work machine, the data collection method using the data collection device to:

generate a collectable list indicating a type of first data that is collectable from the at least one existing component, the collectable list being generated based on a collection method table in which collection method information is stored with respect to each of the at least one existing component, the collection method information including an identifier indicating the type of the first data and a collection method for collecting the first data, detect whether one of the at least one existing component has been removed from the work machine and whether a new component has been connected to an interface of the data collection device, upon detecting that the new component has been connected, acquire new collection method information indicating a type of second data that is acquirable from the new component and a collection method for the second data, and add the new collection method information to the collection method table, upon detecting that one of the at least one existing component has been removed, remove existing collection method information indicating a type of third data that is acquirable from the one of the at least one existing component and a collection method for the third data from the collection method table, update the collectable list based on the collection method table when the new collection method information has been added or the existing collection method information has been removed, transmit the collectable list to an external device outside the work machine in a case in which the collectable list has been updated.

9. The data collection method of a work machine according to claim 8, wherein the at least one existing component and the new component are connected to the interface via a network.

10. The data collection method of a work machine according to claim 9, wherein the collection method includes a format type, an offset value, and a data length for extracting a unified data object corresponding to each of the at least one existing component and the new component from a unit data of the network.

* * * * *